Figure 1:
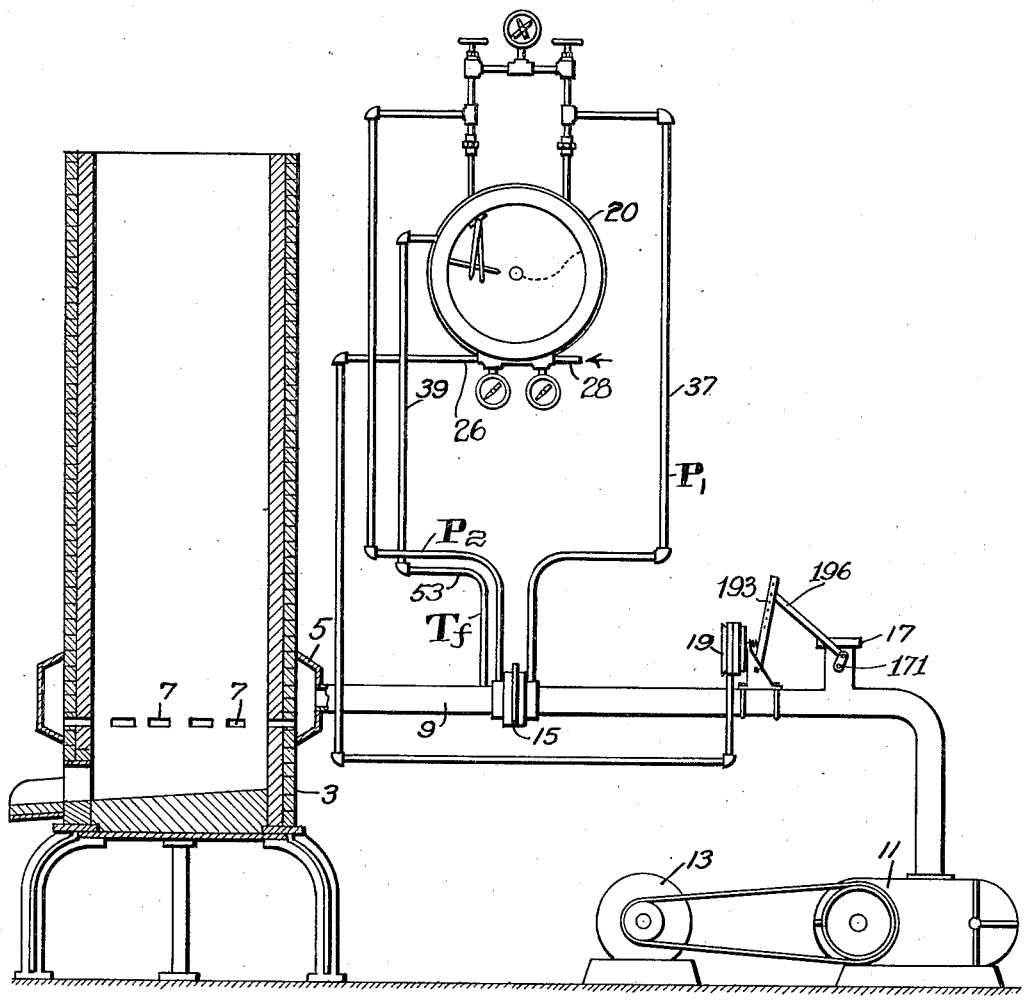

Oct. 16, 1934.   S. R. LEWIS ET AL   1,977,559
CUPOLA OPERATION
Filed May 3, 1933   2 Sheets-Sheet 1

Inventors,
Sidney R. Lewis,
Leland K. Spink,
Byron W. Hagerman.
Attys

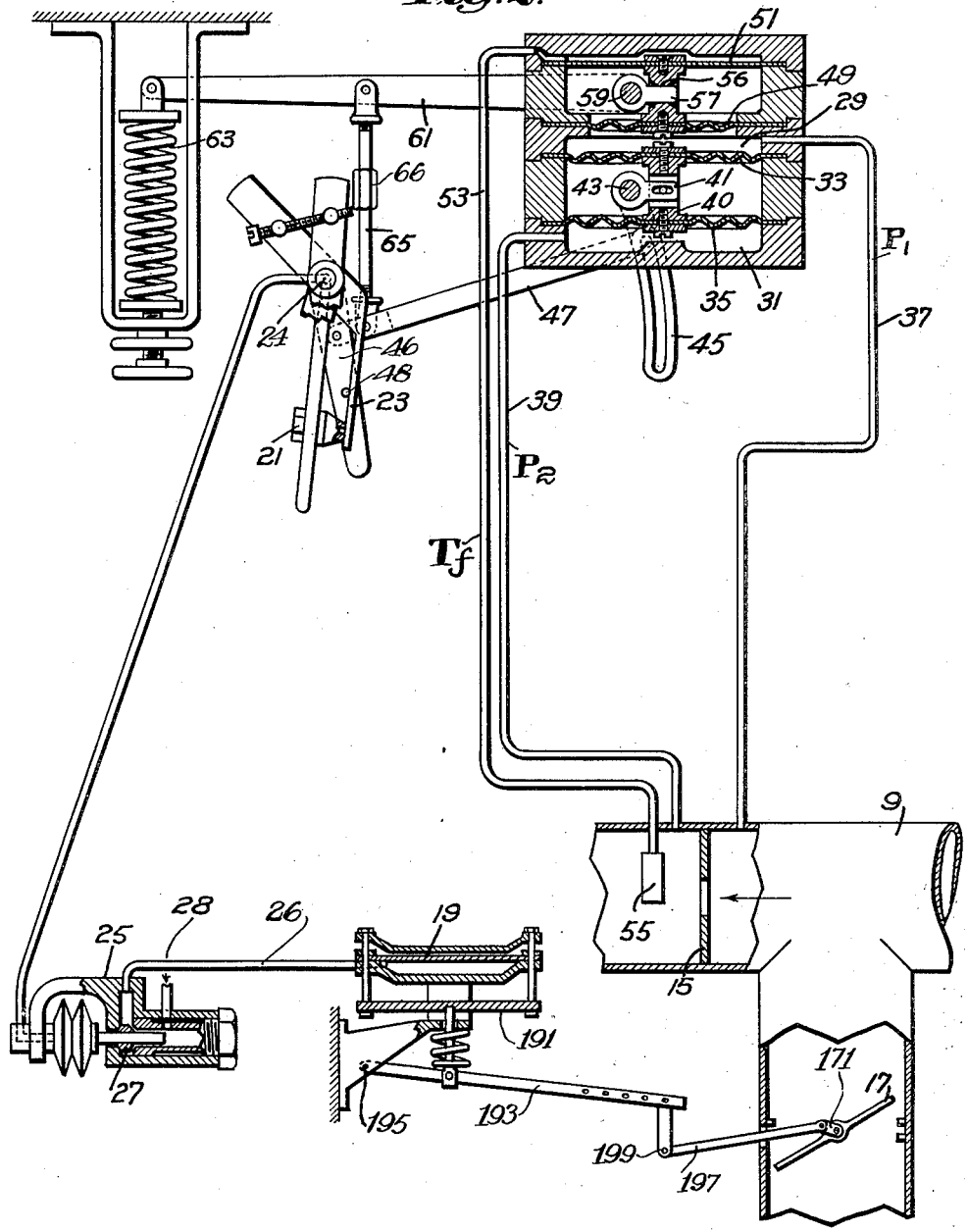

Patented Oct. 16, 1934

1,977,559

UNITED STATES PATENT OFFICE 1,977,559

CUPOLA OPERATION

Sidney R. Lewis, Chelsea, Leland K. Spink, Foxboro, and Byron W. Hagerman, Worcester, Mass., assignors, by direct and mesne assignments, to The Foxboro Company, Foxboro, Mass., a corporation of Massachusetts Application May 3, 1933, Serial No. 669,190

6 Claims. (Cl. 266—30)

REISSUED

This invention relates to the operation of cupola furnaces and the object is to provide a simple arrangement whereby a cupola may be operated under conditions involving the utilization of an accurately proportioned weight of combustion air.

Our invention will be well understood by reference to the following description of an illustrative embodiment thereof shown by way of example in the accompanying drawings, wherein:—

Fig. 1 is a schematic view, partly in section, of a cupola installation illustrative of our invention; and Fig. 2 is a schematic view of the mechanism controlling the air supply, embodying, however, to facilitate the disclosure a slight modification in the mechanical devices for actuating valve 17.

For some time best practice has ruled the use of regular and weighed proportions of iron, limestone and coke for each charge of the cupola. Definite procedures in starting a cupola have been followed. However, for one reason or another air has always until recently, been measured in terms of volume, the proper amount of air in terms of volume being assumed to be handled by means of constant-speed positive-pressure blowers. Recently, however, the importance of using weight of air instead of volume has been emphasized.

Fundamentally the problems arising in melting iron are problems of combustion. With this in mind, we are interested in the weight of oxygen for purposes of combustion rather than the volume of such oxygen. The apparatus which we have suggested provides the necessary corrections for controlling weight rather than volume. Such corrections produce the expected saving of coal or coke due to the use of such optimum condition for combustion purposes.

Hitherto control of the weight of air supplied to cupolas has been effected only by the use of a blower motor adapted to carry only a predetermined load and hence responsive to the inertia of the air actually displaced. Such constructions are expensive and are also not applicable to existing equipment. It has not hitherto been believed possible to control the weight of air through the characteristics of the flow.

A common type of installation and one to which our invention is applicable is shown by way of example in Fig. 1 wherein we have shown the cupola furnace 3 provided with the wind box 5 and tuyères 7 to which air is supplied through blast pipe 9 by means of the positive pressure type of blower 11 operated by an electric motor 13.

The character of the flow in pipe 9 may be determined by the use of a suitable restriction in the pipe, such as the orifice plate 15 (see Fig. 2), to create a differential pressure in the flowing air. The weight of air passing through such an orifice may be determined from the following equation:

$$W = Kd^2 E \sqrt{(P_1 - P_2)\frac{P_1}{T_f}}$$

where W equals mass per unit of time, K is a constant depending upon the units used in the various variables, $d$ is the orifice diameter in linear measure, E is the discharge coefficient of the orifice including the velocity of approach, $P_1$ is the pressure on the upstream side of the orifice, $P_2$ is the pressure on the downstream side, and $T_f$ is the temperature of the flowing air in absolute units. The weight of air is thus a function of several variables and we herein provide a measuring instrument responsive to the several variables to produce a resultant movement proportional to such function for governing a suitable mechanism for regulating the supply of air through the pipe 9. Herein this mechanism takes the form of the usual spilling valve 17 on the intake side of the restriction at 15, which valve, when opened, is adapted to spill to the outer air some of the constant supply of air under pressure delivered from the blower 11 and thus to diminish the quantity delivered to the cupola. Herein this valve is automatically governed responsively to the weight of air passing the restriction.

Referring to Fig. 2, the valve 17 is here shown as operated by a pneumatic motor 19. When pressure in the motor 19 increases, it lifts crosshead 191 against the force of the spring shown, swinging lever 193 upwardly (Fig. 2) about its pivot 195. This rocks bell crank 197 (Fig. 2) pivoted at 199 clockwise. Bell crank 197 is connected to valve 17 by a crank 171 and the valve on this movement tends to close. A construction embodying a bell crank 197 is shown in the diagram Fig. 2 because of the manner in which the parts therein have been arranged to facilitate reading. In Fig. 1 the branch from pipe 9 in which valve 17 is located extends at right angles to the line of movement of the motor and the bell crank is replaced by a simple connecting rod 196. The motor may be governed by a control mechanism of the general type shown in the patent to Johnson 542,733, July 16, 1895, the detailed construction of which may be as shown in the patent to Dixon 1,582,868, April 27, 1926.

The controlling mechanism and the measuring mechanism which governs it may be organized in the case 20 shown in Fig. 1 representing an instrument of the so-called "recorder-controller" type. It will be unnecessary to describe the construction in detail. Suffice it to say with reference to Fig. 2 that there is provided a control couple comprising the valve member or "nozzle" 21 having an exhaust port to atmosphere with which cooperates a valve or "flapper" 23, and that the relative approach and recession of these swinging about a common center line 20 operates a control head 25 containing a valve 27 of the supply and waste type which governs the supply through pipe 26 to the pneumatic motor 19 of operating air under pressure entering at 28, as indicated by the arrow in Fig. 1. We refer to the above mentioned patents for a more detailed description.

In the Dixon patent referred to the specific disclosure is of a controller in which the flapper 23 is moved responsively to temperature. The patent to Bristol 1,641,944, Sept. 6, 1927, discloses a similar controller in which the flapper is operated responsively to differential pressure set up in a flowing fluid. In accordance with our invention the control mechanism may be operated to govern valve 17 responsively to the weight of fluid flowing, by providing a measuring mechanism which produces a movement proportional to the function of the several variables in the foregoing equation and which movement is utilized to position the flapper.

In Fig. 2 the mechanism illustrated for this purpose is substantially that shown in the British patent to Besson et Cie 106,276, May 2, 1916 (convention date), and may be considered as a differential manometer responsive to the differential in pressure set up by the orifice plate 15 and suitably compensated for the pressure of the flowing air and for its temperature. Thus, referring to Fig. 2 of the drawings, we have shown two chambers 29 and 31 which are closed respectively by the opposed yielding diaphragms 33 and 35. To chamber 29 is admitted through pipe 37 pressure, $P_1$, from the upstream side of the orifice and to chamber 31 through pipe 39 pressure, $P_2$, from the downstream side. The differential movement ($P_1$—$P_2$) of the two opposed diaphragms therefore measures the volume of flow through the orifice, the mechanism forming a differential manometer. The block 40 interposed between and connected to the diaphragms transmits the differential movement through arm 41 to shaft 43 to which is attached the slotted segmental crank 45 which operates flapper 23 through connecting rod 47 which is pivotally connected to and operates arm 46 pivoted at 24, from which arm projects a pin 48 for moving flapper 23 to the left against the force of its spring (not shown), all substantially as shown in said Dixon patent, connecting rod 45 corresponding to connecting rod 15 in that patent. To compensate for variations of pressure and temperature, the connecting rod 47 may be slid along the crank 45 so that as the pressure $P_1$ increases, the flapper 23 will be operated through a crank arm of increased length, and as the temperature increases, the length of the crank arm will be shortened. Herein the pressure $P_1$ admitted to chamber 29 acts also on a diaphragm 49 which is opposed by a diaphragm 51. The space in the rear of diaphragm 51 is connected through a passage 53 with a thermometer bulb 55 in blast pipe 9. This bulb may contain volatile fluid so that as the temperature varies, the vapor pressure acting on diaphragm 51 will likewise vary. The block 56 between these two diaphragms 49 and 51 is traversed by a rocker arm 57 on a shaft 59. The aggregate motion of the diaphragms is therefore transmitted to the shaft which carries an arm 61 the other end of which is supported by the adjustably tensioned spring 63, as described in the Besson British patent referred to. For present purposes the left hand end of arm 61 might be considered as supported on a fixed pivot. Arm 61 is connected by a link 65 (herein shown adjustable as to length by means of a turnbuckle 66) to the connecting rod 47, the link being pivoted at its end to the arm and rod.

It will be clear from the drawings that if the pressure $P_1$ increases, tending to rock arm 61 counterclockwise about shaft 59, this motion will be transmitted through link 65 and the point of connection of connecting rod 47 will be slid outwardly along crank 45 and the flapper 23 will be operated responsively to the product of the differential pressure and the static pressure. In other words, arm 116 and therefore flapper 23 are moved as is arm $p^2$ in the aforesaid British patent to Besson, but this motion is used primarily to effect a control operation rather than an indicating or recording operation. Similarly, if the temperature increases, pressing on diaphragm 51 and tending to rock arm 61 clockwise, the point of connection of the connecting rod 47 will be moved towards the center and the movement will be proportional to the quotient of the differential and the temperature. The aggregate movement transmitted to the flapper is thus proportional to $$\frac{(P_1-P_2)P_1}{T_f}.$$

and while it might be transformed into the square root of that expression the form given is equally available for control purposes.

In actual practice we prefer to utilize a differential manometer provided with means for temperature and pressure compensation devised by W. W. Frymoyer, of Foxboro, Massachusetts, for which we understand he has filed application for Letters Patent of the United States, Serial No. 666,132, filed April 14, 1933. We herein disclose the mechanism illustrated in Fig. 2 to emphasize the fact that our invention is independent of the particular measuring instrumentality employed.

We are aware that the invention may be embodied in other specific forms without departing from the spirit or essential attributes thereof, and we therefore desire the present embodiment to be considered in all respects as illustrative and not restrictive; reference being had to the appended claims rather than to the foregoing description to indicate the scope of the invention.

We claim:

1. The combination with a cupola and its blast pipe of a blower of the positive pressure type supplying air to the pipe, means in the blast pipe to produce a differential pressure, a valve at the compressor side of said means for spilling air from the blower, differential pressure measuring means with means for temperature and pressure compensation attached thereto, control means actuated by the differential measuring mechanism to operate said valve so that a constant weight of air is advanced through said blast pipe to the cupola per unit of time.

2. The combination of a positive pressure blower and means for melting metals of the type where metal and the combustible material are intimately associated, a blast pipe conducting air from the blower to the melting means, means in the blast pipe to produce a differential pressure when air is flowing, means for measuring the differential, means for compensating for the temperature and pressure within the blast pipe attached thereto, control mechanism actuated by the combined reactions of the differential measuring means and the pressure and temperature compensation, and valve means actuated by said control mechanism to spill excess air to atmosphere, said spilling means being so actuated that air through blast pipe is maintained at a constant weight rate.

3. The combination with a cupola and its blast pipe of a positive pressure blower supplying air to the pipe, a valve in the pipe for spilling air in excess of a constant weight rate to the atmosphere, means for measuring the flow of air through the blast pipe compensated for temperature and pressure, and control means actuated by measuring means to operate the valve.

4. The combination with a furnace for melting metals of the type where metal and combustible material are intimately associated, a blast pipe for conveying air under pressure thereto, a valve controlling the supply of air passing through the pipe, means in the pipe for creating a differential pressure in the flowing air, means for measuring the differential, means for compensating said measuring means for pressure and temperature of the air, and controlling mechanism actuated by the combined reactions of the differential measuring means and the pressure and temperature compensating means governing said valve.

5. The combination with a furnace for melting metals of the type where metal and combustible material are intimately associated, a blast pipe for conveying air under pressure thereto, means for regulating the supply of air passing said pipe, means in the pipe for creating a differential pressure in the flowing air, means for measuring the differential, means for compensating said measuring means for pressure and temperature of the air, and controlling mechanism actuated by the combined reactions of the differential measuring means and the pressure and temperature compensating means governing said regulating means.

6. The combination with a furnace for melting metals of the type where metal and combustible material are intimately associated, a blast pipe for conveying air under pressure thereto, means in the pipe for creating a differential pressure in the flowing air, a valve interposed between said means and the compressor for diverting some of the discharge of the compressor from the pipe, means for measuring the differential, means for compensating said measuring means for pressure and temperature of the air, and valve actuating means governed by the combined reactions of said differential pressure-measuring means and the pressure and temperature-regulating means.

SIDNEY R. LEWIS.
LELAND K. SPINK.
BYRON W. HAGERMAN.